United States Patent Office 2,726,257
Patented Dec. 6, 1955

2,726,257

ACETYLATION OF HYDROXY NITRILES

William F. Yates, Texas City, Tex., assignor to Monsanto Chemical Company, St. Louis, Mo., a corporation of Delaware No Drawing. Application August 11, 1952,
Serial No. 303,819

18 Claims. (Cl. 260—465.4)

This invention relates to a process for the acetylation of organic compounds and particularly to a process for the acetylation of α-hydroxy nitriles which utilizes ketene as the acetylating agent.

The acetic acid esters of α-hydroxy nitriles are valuable intermediates in the synthesis of unsaturated nitriles. When subjected to pyrolysis these esters give rise to unsaturated nitriles which are themselves required in the manufacture of numerous important synthetic products or readily converted to compounds valuable in the production of pharmaceuticals, surface coatings, dyes, rubber chemicals, explosives, and the like. Acrylonitrile, e. g., used in the production of synthetic rubber and important synthetic fibers, may be produced by pyrolyzing α-acetoxypropionitrile, the acetic acid ester of α-hydroxypropionitrile.

The object of the invention is to provide an improved process of producing such acetic acid esters by acetylation of α-hydroxy nitriles with ketene. Other objects will be apparent from the description of the invention.

The acetylation of α-hydroxy nitriles with ketene has been disclosed and claimed in U. S. Patent 2,383,137. While the yields attainable by the process of the above-named patent are generally fair, it has now been discovered that improved yields may be consistently obtained and the time for completing the reaction may be significantly decreased, if the reaction is carried out in the presence of a catalyst. To achieve these exceptionally high yields which are in most cases nearly quantitative, a small quantity of an alkaline catalyst is added to the liquid hydroxy nitrile as it is fed to the reaction.

According to the invention, α-hydroxy nitriles are reacted with ketene in a countercurrent absorption system with the liquid hydroxy nitrile, to which an alkaline catalyst has been added, entering at the top of the reactor and flowing downward to contact the ketene being introduced at the bottom of the reactor, the acetylated product being withdrawn from the bottom of the reactor.

The following examples illustrate the invention but it is to be understood that they are given merely for illustrative purposes and are not to be considered limitative of the invention.

EXAMPLE 1

The ketene used was generated by pyrolysis of acetone in a standard laboratory ketene lamp. No attempt was made to purify the ketene: in all cases it was contained in a mixture composed chiefly of unreacted acetone, methane, ethylene and carbon monoxide.

The continuous countercurrent reactor employed for acetylation was a laboratory bubble-cap column. The column was completely water-jacketed and tap water was circulated through the jacket to dissipate the heat of the exothermic reaction. The top of the column was equipped with a reservoir for feeding liquid α-hydroxypropionitrile at controlled rates and an off-gas vent for removal of unabsorbed gas which was burned in a small flare. Ketene was fed at the bottom of the reactor and was scrubbed countercurrently by the descending liquid stream. The acetylated product, α-acetoxypropionitrile, passed from the lower end of the reactor through a liquid seal leg at the bottom of the reactor into a receiver. The collected product was fractionated at atmospheric pressure. A caustic scrubber was included in the off-gas line to measure unabsorbed ketene.

Some experiments were conducted in which no catalyst was used while in others 0.1% NaOH was added to the α-hydroxy nitrile liquid as a catalyst. The results of a number of runs given below in tabulated form illustrate the significant increase in yield which can be achieved with as little as 0.1% caustic added as a catalytic agent.

*Table I.—Acetylation of lactonitrile in bubble-cap reactor*

| | Run | | | | | |
|---|---|---|---|---|---|---|
| | A | B | C | D | E | F |
| No. of Plates in Reactor | 15 | 15 | 5 | 11 | 11 | 11 |
| Catalyst | None | None | (1) | (1) | (1) | (1) |
| α-Hydroxypropionitrile fed (moles) | 2.17 | 1.92 | 1.56 | 1.79 | 1.99 | 1.52 |
| Ketene fed (moles) | 2.8 | 2.25 | 1.60 | 1.71 | 3.12 | 2.70 |
| α-Acetoxypropionitrile (moles) | 1.85 | 1.34 | 1.27 | 1.69 | 1.98 | 1.51 |
| Time (hr.) | 5.6 | 4.5 | 2.0 | 2.6 | | |
| Yield, α-acetoxypripionitrile (based on α-hydroxypropionitrile fed) (percent) | 85 | 70.0 | 99.0 | 94.4 | 99.4 | 99.0 |

1 0.1% NaOH.

EXAMPLE 2

Ketene was generated as in Example 1. Instead of the bubble-cap reactor used in Example 1, a simple water-jacketed tube 60 cm. long packed with ⅛ in. helices served as the reactor. Operation was essentially the same as in Example 1 with α-hydroxypropionitrile being fed at the top of the column at a rate of about 0.42 mole/hr. and ketene being introduced at the bottom of the reactor at about 0.5 mole/hr. The acetylated product after passing a liquid seal leg at the bottom of the column was collected in a receiver and analyzed by fractionation. Several runs in which 0.1% NaOH was added as a catalyst in the reaction were made as was a control run in which no catalyst was employed. As may be seen from the summary presented in Table II, the use of a catalyst makes the yield practically quantitative as compared with a very low yield when no catalyst is employed.

*Table II.—Acetylation of lactonitrile in a packed column*

| | Run | | | |
|---|---|---|---|---|
| | A | B | C | D |
| Catalyst | None | (1) | (1) | (1) |
| α-Hydroxypropionitrile (moles) | 1.87 | 1.24 | 1.27 | 2.01 |
| Ketene Fed (moles) | 2.0 | 1.50 | 1.42 | 2.20 |
| α-Acetoxypropionitrile (moles) | 0.39 | 1.17 | 1.27 | 1.97 |
| Yield, α-acetoxypropionitrile (based on α-hydroxypropionitrile fed) (percent) | 20.9 | 94 | 100 | 98 |

1 0.1% NaOH.

EXAMPLE 3

α-Hydroxy-n-butyronitrile is acetylated with crude ketene in the same apparatus and employing the same general procedure as described in Example 1 with 0.1% potassium acetate added to the nitrile stream as a catalyst. Yields of α-acetoxy-n-butyronitrile are comparable to those obtained in the runs of Example 1 in which sodium hydroxide was employed as catalyst.

EXAMPLE 4

Equimolar quantities of α-methyl-α-hydroxybutyronitrile and ketene are reacted in a bubble-cap column following the procedure given in Example 1 with 0.1% of benzyltrimethylammonium hydroxide added as a catalyst to the nitrile stream. From an analysis of the acetylated product by fractionation it is ascertained that an excellent yield of α-methyl-α-acetoxybutyronitrile is obtained.

EXAMPLE 5

Ketene, generated by pyrolysis of acetone in a standard laboratory lamp as in previous examples, is reacted with an equimolar quantity of α-hydroxy-n-valeronitrile in the same apparatus and following the same procedure given in Example 1. To the nitrile stream there is added a catalytic quantity, about 0.1%, of hydroxyethyltrimethylammonium bicarbonate. The yield of α-acetoxy-n-valeronitrile obtained closely approximates 100%.

As will be apparent to those skilled in the art, conditions under which the reaction is conducted, particular reactants employed, quantities of reactants, etc., are not limited to those specified in the above examples but are subject to substantial variation.

Other typical α-hydroxy nitriles, such as α-hydroxyisobutyronitrile, α-hydroxy-isovaleronitrile, 1-cyano-1-hydroxy-butene-2, α-hydroxy-β-phenylpropionitrile, and the like can be acetylated by the process of the invention.

The purity of the ketene employed does not affect the efficiency of the process. Hence the crude mixture obtained by pyrolysis of acetone, for example, in which ketene is contained along with methane, ethylene, carbon monoxide, and the like, can be used as such. This is a decided advantage because it offsets any necessity for purification of ketene and represents considerable saving in both capital and operating costs, since purification of ketene is a costly process.

Standard countercurrent absorption equipment such as a packed tower or a bubble-cap or plate column which provides for intimate contact of gas and liquid over a large interphase surface may serve as the acetylation reactor. The reaction is exothermic and liberates large quantities of heat. It is carried out, therefore, at room temperature without any additional heating. Conventional means for cooling, such as interstage coolers, e. g., should be provided to maintain the reaction temperature between 30–50° C. while the preferred temperature of 30–50° C. gives optimum yields in minimum time the invention is not limited thereto. The reaction will proceed at temperatures as low as liquid air temperatures and may be conducted at temperatures above 50° C. It should be noted, however, that higher temperatures promote tar formation and thus cut down the yield of the desired product. The upper limit of temperature used is governed also by the stability of the ketene and the stability of the particular α-hydroxy nitrile being acetylated.

Equimolar quantities of both reactants are preferably employed in the reaction. The use of excess ketene is undesirable since it appears to contribute to increased formation of by-products. In actual operation, in the countercurrent system employed, there is always a large excess of ketene at the bottom of the reactor and a corresponding large excess of the hydroxy nitrile at the top even when equimolar quantities are fed.

The alkaline catalysts suitable for employment in the reaction include: the hydroxides of the alkali metals such as sodium hydroxide, potassium hydroxide, lithium hydroxide, etc.; ammonium and quaternary ammonium hydroxides such as benzyltrimethylammonium hydroxide, hydroxyethyltrimethylammonium hydroxide, and phenyltrimethylammonium hydroxide; alkaline alkali metal salts such as sodium acetate, sodium carbonate, potassium carbonate, sodium propionate, and the like; and alkaline quaternary ammonium salts such as hydroxyethyltrimethylammonium bicarbonate (choline bicarbonate), hydroxyethyltrimethylammonium acetate, (choline acetate) and the like. Organic bases such as tributyl amine have only a very slight catalytic effect. Only very small amounts of the preferred catalysts are required. From 0.01% to 0.1% by weight of the reactants is adequate but larger quantities as, e. g., 1%, can be used if desired.

In addition to increasing the yields in question, the use of these catalysts significantly decrease the contact time required for the acetylation reaction. The use of 0.1% NaOH, e. g., reduces the 30 or 40-minute contact time necessary in the uncatalysed reaction to from 5–10 minutes.

While operation at atmospheric or increased pressure is the preferred method, the process may be carried out at reduced pressures.

What is claimed is:

1. A process for producing α-acetoxy nitriles which comprises reacting an α-hydroxy nitrile and ketene in the presence of an alkaline catalyst selected from the group consisting of the alkali metal, ammonium, and quaternary ammonium hydroxides and the alkaline alkali metal and alkaline quaternary ammonium salts.

2. The process of claim 1 in which ketene is crude ketene.

3. A process for producing α-acetoxy nitriles which comprises reacting, at a temperature from about 30° C. to about 50° C., an α-hydroxy nitrile and ketene in the presence of an alkaline catalyst selected from the group consisting of the alkali metal, ammonium, and quaternary ammonium hydroxides and the alkaline alkali metal and alkaline quaternary ammonium salts.

4. The process of claim 3 in which ketene is crude ketene.

5. A process for producing α-acetoxy nitriles which comprises reacting, at substantially room temperature and without additional heating, an α-hydroxy nitrile and ketene in the presence of an alkaline catalyst selected from the group consisting of the alkali metal, ammonium, and quaternary ammonium hydroxides and the alkaline alkali metal and alkaline quaternary ammonium salts.

6. The process of claim 5 in which ketene is crude ketene.

7. A process for producing α-acetoxy nitriles which comprises reacting, at substantially room temperature and without additional heating, an α-hydroxy nitrile and ketene in the presence of an alkaline catalyst selected from the group consisting of the alkali metal, ammonium, and quaternary ammonium hydroxides and the alkaline alkali metal and alkaline quaternary ammonium salts in an amount from about 0.01% to about 1% by weight of reactants.

8. The process of claim 7 in which ketene is crude ketene.

9. A process for producing α-acetoxy nitriles which comprises reacting, at substantially room temperature and without additional heating, an α-hydroxy nitrile with ketene in the presence of an alkaline catalyst selected from the group consisting of the alkali metal, ammonium, and quaternary ammonium hydroxides and the alkaline alkali metal and alkaline quaternary ammonium salts in an amount from about 0.01% to 0.1% by weight of reactants.

10. The process of claim 9 in which ketene is crude ketene.

11. A process for producing α-acetoxy nitriles which comprises reacting, at substantially room temperature and without additional heating, an α-hydroxy nitrile with ketene in the presence of an alkali metal hydroxide in an amount from about 0.01% to about 0.1% by weight of reactants.

12. The process of claim 11 in which ketene is crude ketene.

13. A process for producing α-acetoxy nitriles which comprises reacting, at substantially room temperature and without additional heating, an α-hydroxy nitrile with ketene in the presence of an alkaline alkali metal salt in an amount from about 0.01% to about 0.1% by weight of reactants.

14. The process of claim 13 in which ketene is crude ketene.

15. A process for producing α-acetoxy nitriles which comprises reacting, at substantially room temperature and without additional heating, an α-hydroxy nitrile and ketene in the presence of from about 0.01% to about 0.1% sodium hydroxide.

16. The process of claim 15 in which ketene is crude ketene.

17. A process for producing α-acetoxypropionitrile which comprises reacting, at substantially room temperature and without additional heating, α-hydroxypropionitrile and ketene in the presence of from about 0.01% to about 0.1% sodium hydroxide.

18. The process of claim 17 in which ketene is crude ketene.

References Cited in the file of this patent

UNITED STATES PATENTS

| | | |
|---|---|---|
| 2,383,137 | Lecher et al. | Aug. 21, 1945 |
| 2,395,930 | Johnston et al. | Mar. 5, 1946 |
| 2,456,188 | Hansley et al. | Dec. 14, 1948 |

OTHER REFERENCES

Ponomarev et al.: Chem. Abstracts, vol. 44, column 9349 (1950).